US007086322B2

(12) United States Patent
Schulz

(10) Patent No.: US 7,086,322 B2
(45) Date of Patent: Aug. 8, 2006

(54) FLUIDIC DEVICE

(75) Inventor: Stefan Schulz, Bretten (DE)

(73) Assignee: Forschungszentrum Karlsruhe GmbH, Karlsruhe (DE), .

( * ) Notice: Subject to any disclaimer, the term of this patent is extended or adjusted under 35 U.S.C. 154(b) by 2 days.

(21) Appl. No.: 10/952,419

(22) Filed: Sep. 28, 2004

(65) Prior Publication Data

US 2005/0066810 A1 Mar. 31, 2005

(30) Foreign Application Priority Data

Sep. 29, 2003 (DE) ................................ 103 45 587

(51) Int. Cl.
*F16J 3/00* (2006.01)

(52) U.S. Cl. ................................... 92/42; 92/43; 92/45

(58) Field of Classification Search .................... 92/34, 92/42, 43, 45, 46, 47, 92
See application file for complete search history.

(56) References Cited

U.S. PATENT DOCUMENTS

| | | | | |
|---|---|---|---|---|
| 2,324,173 | A * | 7/1943 | Porter | 92/42 |
| 3,981,528 | A * | 9/1976 | Andorf et al. | 92/92 |
| 4,784,042 | A * | 11/1988 | Paynter | 92/92 |
| 4,852,675 | A * | 8/1989 | Wang | 92/42 |
| 5,083,498 | A * | 1/1992 | Sato et al. | 92/92 |
| 5,251,538 | A * | 10/1993 | Smith | 92/34 |
| 5,317,952 | A * | 6/1994 | Immega | 92/43 |
| 2003/0110938 | A1* | 6/2003 | Seto et al. | 92/92 |

* cited by examiner

*Primary Examiner*—Edward K. Look
*Assistant Examiner*—Michael Leslie
(74) *Attorney, Agent, or Firm*—Klaus J. Bach

(57) ABSTRACT

In a fluidic drive for disposition between two components which are movable relative to each other comprising a hollow body with a duct for supplying fluid to, and discharging it from, the hollow body wherein the hollow body consists at least partially of a bellows structure, non-resilient ring elements extend around the hollow body in each of its pleats and a connecting structure extends at least at one side of the hollow body and interconnects the non-resilient ring elements.

8 Claims, 3 Drawing Sheets

FLUIDIC DEVICE

BACKGROUND OF THE INVENTION

The invention resides in a fluidic drive disposed between two compounds which are arranged so as to be movable relative to each other and comprising a hollow body with a fluid admission and a fluid discharge line.

Such drives are used for initiating translatory movements, but also pivot movements or rotational movements mainly in the area of robotics but also prosthetics. They comprise essentially at least one hydraulic or pneumatic drive element disposed between two parts which are arranged movably relative to each other. The drive elements are connected to each of the two parts by at least one force transmission area. Preferably, the drive element comprises a hollow body with an operating fluid supply and discharge line.

DE-AS 23 45 856 discloses a fluidic drive in connection with a manipulator which comprises a bladder disposed at the side of a joint between two opposite force areas of two components such that an expansion of the bladder by filling it with an operating fluid causes the two face areas to be moved apart thereby providing for a pivot or rotational movement of the two components about the pivot joint. A non-resilient sleeve disposed around the bladder limits the volume of the bladder in the radial direction of the sleeve.

The force transmission areas of this drive cover the whole face areas. Since no particular means for the transfer of the drive forces, that is, no particular force guide structures are provided, the operating forces also change during the expansion of the drive. Furthermore, the drive bladder expands in all directions about at the same rate. As a result, not only the force that can be transmitted is limited but also the pivot angle is relatively small and the thickness of the joint including such a drive increases with the expansion of the drive bladder.

It is therefore the object of the present invention to provide a fluidic drive with a guided hollow body which is suitable for the transfer of high forces in connection with large strokes or pivot angles with a relatively small amount of operating fluid. Particularly, the drive should remain relatively slim in any filling state thereof so as to be usable also under tight conditions.

SUMMARY OF THE INVENTION

In a fluidic drive for disposition between two components which are movable relative to each other comprising a hollow body with a duct for supplying fluid to, and discharging it from the hollow body wherein the hollow body consists at least partially of a bellows structure, non-resilient ring elements extend around the hollow body in each of its pleats and a connecting structure extends at least at one side of the hollow body and interconnected the non-resilient ring elements.

The hollow body is fluid-tight and at least partially in the form of a bellows. It has a fluid-tight wall and fluid admission and discharge passages. It has a predetermined direction of expansion; with the introduction of fluid, it grows essentially only in one direction which is predetermined by the bellows-like shape of the hollow body. Expansion normal to the predetermined direction is greatly limited because of the configuration of the hollow body. Also, the operating fluid volume needed for a certain stroke or pivot or rotational movements is limited by the high stiffness of the hollow body in radial that is a direction transverse to the operating direction. Since the cross-section of the drive normal to the operating direction changes only insignificantly during operation, also the actuating force can be more accurately controlled and dosed for small movements. The expansion force of the hollow body is transferred to adjacent components by way of at least two force transmission areas.

It is unimportant whether the wall of the hollow body is of single- or multi-wall design. For example, it may comprise a combination of an elastic fluid-tight inner wall consisting for example of an elastomer (such as rubber) and an expansion-resistant outer wall such as a fabric sleeve. For a single-wall design, for example, elastic materials may be used which are either sufficiently rigid by themselves or stiffened by reinforcements incorporated therein.

In accordance with the invention, the hollow body is guided mainly by non-stretchable annular elements which surround the bellow-like hollow body in each pleat and which may be integrated into the walls or are guided thereby. Furthermore, the annular elements are connected to at least one of the two force transfer areas at least at one side of the bellows-like hollow body by way of a non-stretchable connection. Particularly, if the hollow body is not used as a pivot drive but as a translatory drive, several non-stretchable connections may be provided distributed over the circumference of the hollow body.

Basically, the annular elements comprise all components which extend around at least one cross-section in a non-stretchable manner and do not exceed a certain construction height, material strength or thickness, that is, for example metal sheets, foils or plates with perforations. The annular elements may also be integrated into the walls as non-stretchable inserts such as wires or filaments.

The non-stretchable connection forms a guide structure for the annular elements and does not need to be connected to the annular elements. It is sufficient if the annular elements are attached to the connection by way of intermediate components. This is for example the case if the connection is not attached directly to the annular elements but to the outer areas of the pleats that is to the wall of the hollow body while the annular elements are adequately fixed to, and guided by, the inner wall areas of the folds. The annular elements are then retained in the pleats, that is, in the areas of smaller cross-section of the bellows in a form-locking manner.

Non-stretchable in this connection for all the annular elements, walls or connections means that there is no undesired stretching. But, in accordance with the invention, a tolerable or desirable degree of stretchability of the non-stretchable components for example for a reduction of local stress peaks or to avoid damage to the fluidic drive may be provided. Particular reference is made at this point to the functions of the non-stretchable components which are provided to avoid sideward expansions of the hollow body and which ensure the guidance and predetermined movement of the hollow body and the drive elements.

The connections of the annular elements with a force transmission area are provided at one side of the hollow body and limit accordingly the maximum distance of the annular elements from the force transmission areas. With this guide structure, uncontrolled outward movement of the hollow body is prevented so that also relatively large forces can be transmitted from the bellows-like hollow body by way of the force transmission areas to the two components.

If the non-stretchable connection is attached to more than one force transmission area also the maximum stroke or the pivot angle of the drive is limited. Reference is made to the particular guidance of the annular elements with maximum stroke or respective pivot angle by the connection which in this position is tightly straightened.

In its empty state and with a thin wall and thin annular elements the bellows-like hollow body has a very short length. In this way, the fluidic drive may be used also under tight conditions between the front faces of two components which are interconnected by a joint for example in a manipulator as disclosed in DE AS 23 45 856. It is also basically suitable for the operation of pivot members over large angular areas because of the guide elements referred to earlier and the unidirectional expansion of the bellows-like hollow body.

The invention will be described below in greater detail on the basis of the accompanying drawings.

DESCRIPTION OF THE VARIOUS EMBODIMENTS

Figure 1:
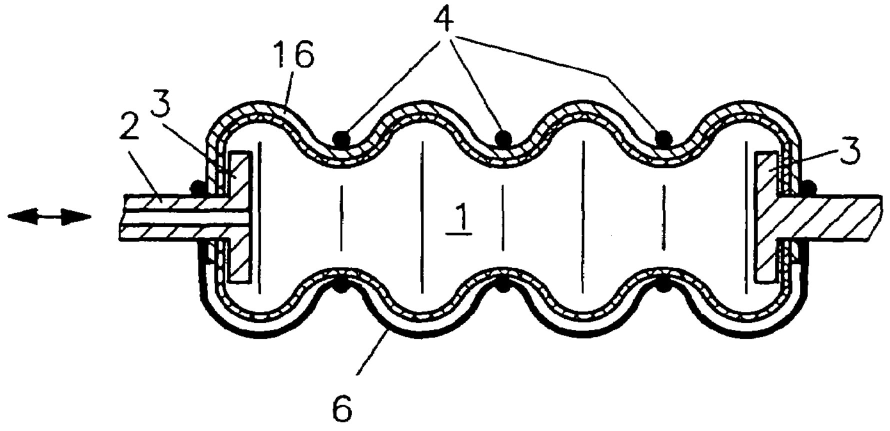
FIG. 1 shows a first embodiment with a string-like connection and string-like ring members connected to the string connection and with a separate reinforcement.

All figures show a fluidic drive arrangement with a hollow body 1 having at least one hydraulic fluid admission or discharge passage 2 forming a hydraulic or pneumatic drive element. In each of the shown embodiments, the hollow body has an at least partially bellows-like configuration. Further the planar force input areas 3, the annular elements 4 in the pleats 5 and the non-stretchable connection 6 of the particular embodiment are shown in each case.

Figure 2:
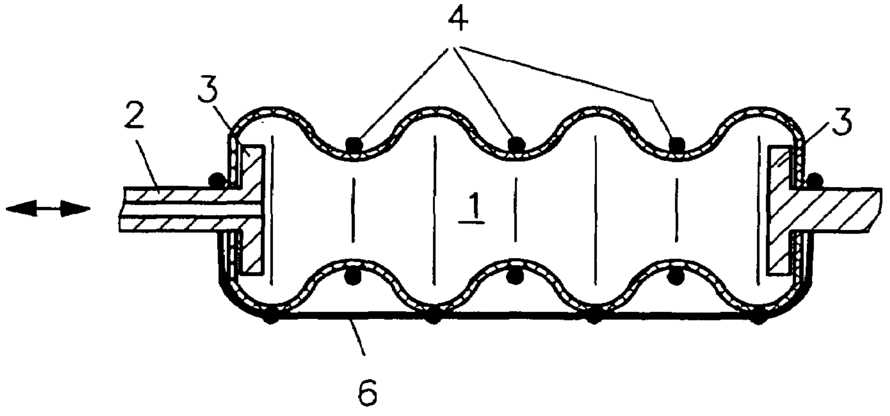
FIG. 2 shows a second embodiment with a string-like connection and string-like ring elements which are not directly connected to the string-like connection.

FIGS. 1 and 2 show embodiments wherein the connection 6 and the ring elements 4 are formed by strings or wires. While the ring elements and the connection are in the first embodiment directly connected to each other (FIG. 1), for example, by knotting, cementing or connections wherein the string extends below the ring elements, the connection 6 is in the second embodiment (FIG. 2) directly connected to the outer areas of the pleats 5 for example by stitching. In that case, the ring elements 4 are guided by the pleats and therefore indirectly by the connection 6. In this case, the pleats can, as shown in FIG. 1, be protected by an additional bendable but non-resilient reinforcement structure 16, which is fixed to the force introduction areas 3 and connected to the ring elements, from an uncontrolled expansion of the hollow body in local areas (for example, in pivot drives of the outer area). The force transmission areas 3 are shown in both figures as mushroom or bolt-like elements over which the hollow body is pulled and which are cemented to the hollow body in a fluid-tight manner or screwed, clamped or vulcanized. The shaft of the support structure may include a central passage for the admission to or release of fluid to or from the hollow body. It may also include a threaded section for a nut permitting the clamping of the hollow body wall between the nut and the support head, or for the mounting of the hollow body to a component.

Figure 3:
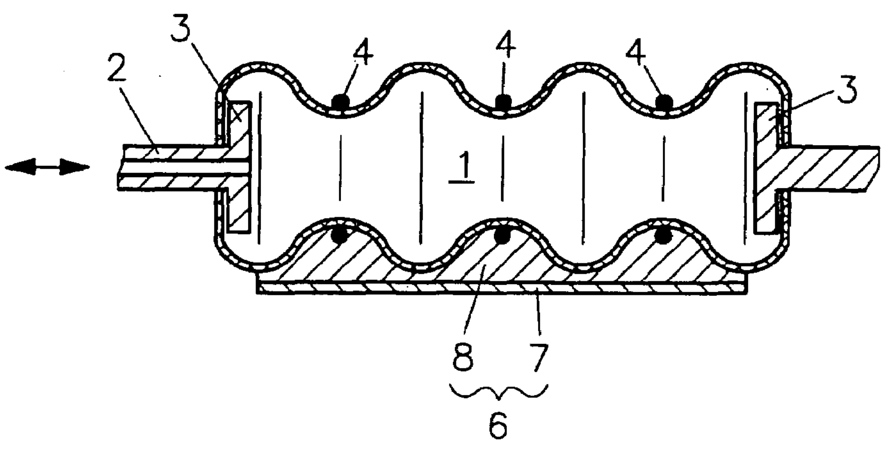
FIG. 3 shows a third embodiment with a non-stretchable connection comprising a cemented structure.

FIG. 3 shows an embodiment wherein the non-resilient connection 6 comprises at least at one side a cemented or vulcanized structure 8 which engages the ring elements 4 at one side of the hollow body. The cemented or vulcanized structure only serves as a filler connection between the bellows-like hollow body 1 and a non-resilient component such as a belt 7. In another embodiment not shown in the figures, the cemented or vulcanized structure 8 either itself has sufficient rigidity but remains sufficiently bendable or it is reinforced by the incorporation of reinforcement structures such as fibers.

Figure 4:
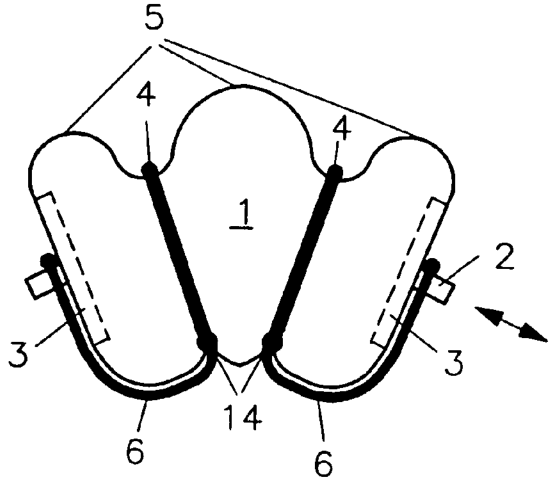
FIG. 4 shows a fourth embodiment with a connection wherein at one side the pleats are joined together.

FIG. 4 shows a fourth embodiment with a connection 6 in the form of pleats interconnected at one side of the hollow body which are connected to the force transmission areas 3 in a non-elastic manner (for example by strings). In contrast to the arrangements shown in the previous figures, the connection comprises in addition to the additional components such as strings or cement, particularly non-resilient wall areas between the individual, preferably point-like, connections 14 on the pleats.

Figure 5:
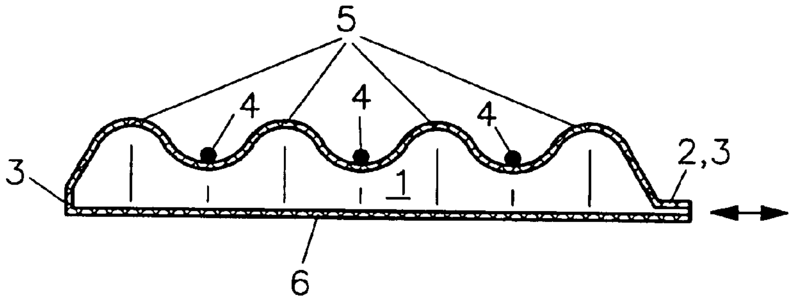
FIG. 5 shows a fifth embodiment wherein the connection is formed by a non-resilient wall section.

FIG. 5 shows a fifth embodiment wherein the connection and the ring elements are formed by correspondingly designed non-elastic walls. The pleats or bellows configuration of the hollow body and consequently an expandability of the hollow body exists only at one side of the hollow body (in FIG. 5 the upper half) whereas the flat area opposite the pleated wall area is formed by a non-stretchable wall and therefore represents the non-resilient connection 6.

Because of the small diameters of the supply and release duct 2 hollow bodies as shown in FIG. 5 cannot be manufactured by a single stage vulcanization process on a molded core. They are therefore manufactured for example by a two-stage molding process wherein, in a first step, the bellows-like area of the hollow body is manufactured for example from an elastomer by way of a vulcanizing process and, in a second step, the smooth or flat area consisting of an elastomer possibly with an additional non-resilient reinforcement structure is applied in a fluid-tight manner by a second vulcanizing step.

Figure 6B:
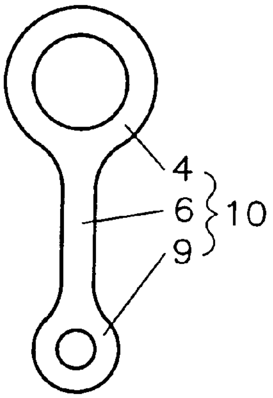
FIGS. 6*a* and 6*b* show a sixth embodiment wherein the ring elements and connections consist of a foil material or strap elements extending around the bellows and having straps connected to the ends of the bellows.
Figure 6A:
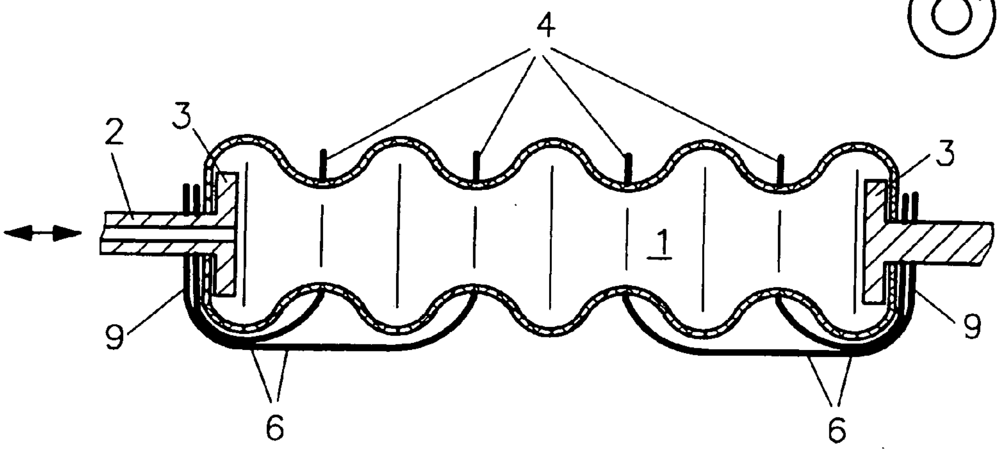

In a sixth embodiment as shown in principle in FIGS. 6*a* and 6*b*, non-resilient connections 6, ring elements 4 and mounting means 9 for attaching the connections 6 to the connecting areas 3 are comprised of at least one guide component 10 of a foil material. A pattern for such a guide component 10 is shown in FIG. 6*b*. FIG. 6*a* shows the application of several such guide members to a bellows-like hollow body 1, wherein, in the arrangement shown, each pleat is provided with its own guide member which is connected to the force transmission area. Other possible versions comprise also a coupling of two or several connecting areas by way of, in each case, a single guide member. If used as a pivot drive, the connections 6 may not be provided only at one side as shown in FIG. 6, but additionally at the opposite side.

Figure 7A:
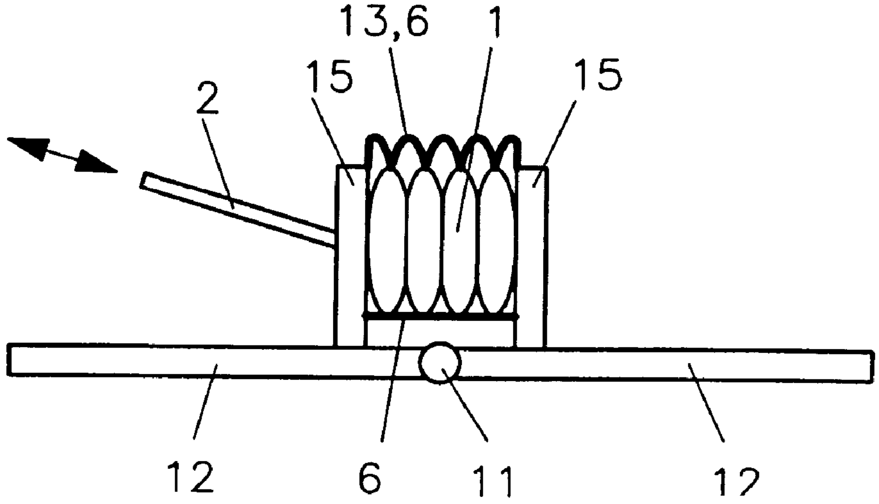
FIGS. 7*a* and 7*b* show another embodiment in the form of a pivot drive with two parallel non-stretchable connecting straps joint to opposite sides of the bellows to form a finger joint.
Figure 7B:
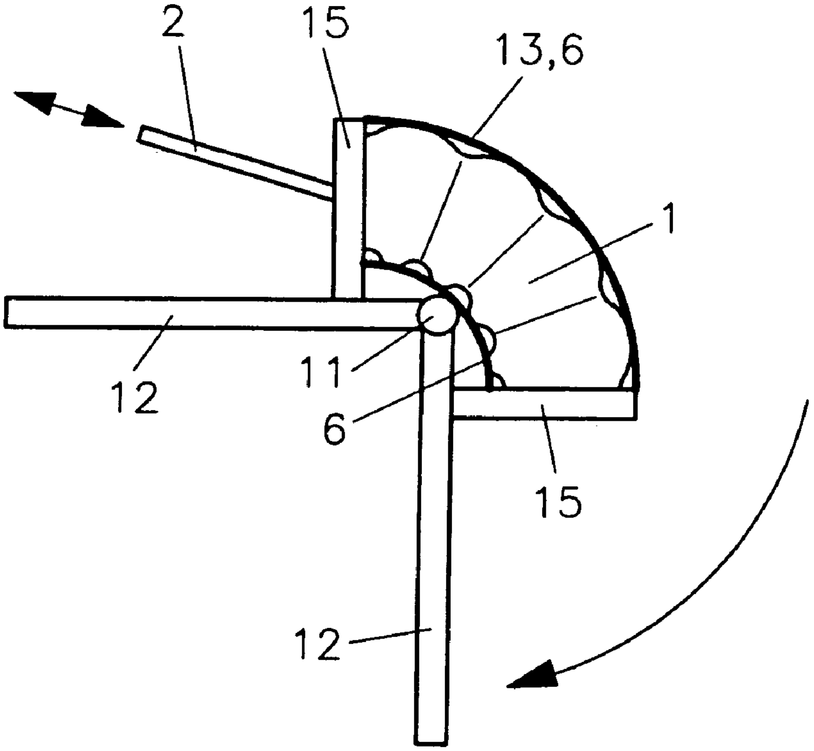

The installation of the fluidic drive on two components 12, which are interconnected by a joint 11, is shown for example in FIGS. 7*a* and 7*b*. The components 12 include each a support structure 15 forming the force transmission areas of the hollow body 1 which, in one pivotal position as shown in FIG. 7*a*, are arranged opposite each other in parallel spaced relationship and are forced apart by the introduction of a working fluid into the hollow body. As already described in connection with the fifth embodiment, the connections are provided at the opposite sides of the hollow body 1 wherein particularly the outer connection 13 does not only prevent an outward movement of the hollow body but also limits the pivot angle (FIG. 6*b*).

What is claimed is:

1. A fluidic drive for disposition between two components which are movable relative to each other, comprising at least one fluid drive element having at least one force transmission area in contact with the components, said fluidic drive element comprising a hollow body with a duct for supplying fluid to, and discharging it from, said hollow body, said hollow body consisting at least partially of a bellows structure with a flexible and non-resilient wall structure consisting of an elastic inner wall and a non-resilient outer wall, non-resilient ring elements extending around said hollow body in each pleat thereof, and a connecting structure extending at least at one side of said hollow body and interconnecting said non-resilient ring elements and being connected to one of the force transmission areas.

2. A fluidic drive according to claim 1, wherein said non-resilient wall structure consists of a fiber-reinforced material.

3. A fluidic drive according to claim 1, wherein said hollow body is disposed between said two components which are interconnected by a joint.

4. A fluidic drive for disposition between two components which are movable relative to each other, comprising at least one fluid drive element having at least one force transmission area in contact with the components, said fluidic drive element comprising a hollow body with a duct for supplying fluid to, and discharging it from, said hollow body, said hollow body consisting at least partially of a bellows structure, non-resilient ring elements extending around said hollow body in each pleat thereof, and a connecting structure extending at least at one side of said hollow body and interconnecting said non-resilient ring elements and being connected to one of the force transmission areas, said non-resilient ring elements and said connecting structure consisting of a plastic foil.

5. A fluidic drive according to claim 4, wherein said non-resilient ring elements and said connecting structure consist of a string.

6. A fluidic drive according to claim 4, wherein said hollow body is disposed between said two components which are interconnected by a joint.

7. A fluidic drive for disposition between two components which are movable relative to each other, comprising at least one fluid drive element having at least one force transmission area in contact with the components, said fluidic drive element comprising a hollow body with a duct for supplying fluid to, and discharging it from, said hollow body, said hollow body consisting at least partially of a bellows structure, non-resilient ring elements extending around said hollow body in each pleat thereof, and a connecting structure extending at least at one side of said hollow body and interconnecting said non-resilient ring elements and being connected to one of the force transmission areas, said connecting structure is formed by joining adjacent pleats by one of stitching, vulcanizing and cementing.

8. A fluidic drive according to claim 7, wherein said hollow body is disposed between said two components which are interconnected by a joint.

* * * * *